Nov. 20, 1962 E. G. PERRY, JR., ET AL 3,064,560

PRINTING RECORDER AND PUNCHING CONVERTER

Filed Sept. 8, 1959 7 Sheets-Sheet 1

INVENTORS

Edward Gordon Perry, Jr.
& Herman L. Philipson, Jr.

BY

Stevens, Davis, Miller & Mosher
ATTORNEYS

INVENTORS
Edward Gordon Perry, Jr.,
& Herman L. Philipson, Jr.
BY
Stevens, Davis, Miller & Mosher
ATTORNEYS INVENTORS
Edward Gordon Perry, Jr.,
& Herman L. Philipson, Jr.
BY
Stevens, Davis, Miller & Mosher
ATTORNEYS INVENTORS
Edward Gordon Perry, Jr.,
& Herman L. Philipson, Jr.
BY
Stevens, Davis, Miller & Mosher
ATTORNEYS

PRINTING RECORDER AND PUNCHING CONVERTER

Filed Sept. 8, 1959 7 Sheets-Sheet 5

INVENTORS

Edward Gordon Perry, Jr,
& Herman L. Philipson, Jr.

BY
Stevens, Davis, Miller & Mosher
ATTORNEYS

INVENTORS
Edward Gordon Perry, Jr.
& Herman L. Philipson, Jr.
BY
Stevens, Davis, Miller & Mosher
ATTORNEYS INVENTORS
Edward Gordon Perry, Jr.,
& Herman L. Philipson, Jr.
BY
Stevens, Davis, Miller & Mosher
ATTORNEYS 3,064,560
Patented Nov. 20, 1962

3,064,560

PRINTING RECORDER AND PUNCHING CONVERTER

Edward Gordon Perry, Jr., and Herman L. Philipson, Jr., Dallas, Tex., assignors, by mesne assignments, to Sperry Rand Corporation, New York, N.Y., a corporation of Delaware Filed Sept. 8, 1959, Ser. No. 838,470
11 Claims. (Cl. 101—90)

The present invention relates to a printing recorder for printing certain desired information on cards or invoices. This invention also relates to a punching converter for use in conjunction with the printing recorder for the purpose of punching the same information, in the form of perforations on the same or auxiliary card or invoice in accordance with the printed information provided by the printing recorder.

This invention, more particularly, pertains to the recording and invoicing of retail credit sales at gasoline service stations or other sales establishments where customer's credit cards are employed in conjunction with a suitable credit system.

The credit cards used will carry the customer's name and address in embossed or debossed letters and the customer's account number in embossed or debossed numerals; preferably, the account number will also be present in the form of an embossed or debossed code.

The printing recorder of the present invention is a unit which will be placed at the site of each gasoline service station (or other sales establishment) where it is desired to use the same.

Briefly and simply stated, the printing recorder of the present invention is enclosed in a substantially rectangular casing having a cover at the upper end thereof which, when opened, exposes a substantially flat printing field. With the cover in the open position, the customer's credit card is placed in a predetermined position on the printing field and a suitable invoice is superimposed on the credit card over the printing field. As will hereinafter appear, suitable embossed characters are moved into the printing field in accordance with the date and the amount of the sale. Thereafter, the cover is closed and a suitable roller, which is slidably mounted on the cover, is moved over the invoice pressing the same against the various characters in the printing field. The invoice which consists of two or more sheets of paper interleaved with carbon paper, will then have printed thereon the information relating to the customer's name, the customer's account number in coded and/or numerical form, the name and location of the vendor, the date, the numerical value of the sale, and the amount of the sale in the form of a printed code.

A novel feature of the printing recorder of the present invention resides in an arrangement whereby the numerical value of the sale is printed simultaneously with the coded representation of this sale. As will hereinafter more fully appear, the means for effecting this result comprises a plurality of parallel and rotatable wheels or discs upon each of which a series of raised numerals is circumferentially spaced. Each disc or wheel is so located with respect to the printing field that the raised numerals may be moved selectively into the printing field upon rotation of the disc. Also, each disc is provided with a cammed sector or portion against which an end of a movable printing bar is resiliently urged. The location and configuration of this cammed sector is oriented with respect to the raised numerals such that the movable printing bar is moved towards or away from the central axis of the rotatable disc in accordance with the particular numeral which is present in the printing field.

The upper end of the movable printing bar is provided with three raised rectangular blocks which are spaced with respect to one another and are of different lengths. As will also hereinafter appear, the portion of the printing field which surrounds the upper ends of the movable printing bars is defined as the "code printing field." The raised blocks at the upper end of the printing bars are movable into, out of, and within this code printing field so as to provide different coded representations corresponding to the raised numerals in the general printing field.

The punching converter, which, as indicated hereinafter, may be of several different constructions, is adapted to sense, by photo electric means, the information which is recorded on the invoice in the form of the printed code and to actuate a standard card punching apparatus to record the same information on the invoice, or copy thereof, in the form of perforations. Thus, the punched invoice (or card) may be used later in automatic accounting operations.

Briefly and simply stated, the punching converter of the present invention includes a means for illuminating the portion of the invoice where the printed code is located. An optical system, including a lens and a series of mirrors will focus the image of the printed code on a photo cell matrix. A suitable decoding unit, operating in response to the actuation of the photo cell matrix, will actuate a punch so as to perforate the card or invoice and thereby provide, in the form of a punched code, the same information which was recorded on the invoice in the form of the printed code. The punching converter will also include various means for adjusting the positions of the mirrors for the purpose of properly aligning the image of the printed code with respect to the photo cell matrix.

Therefore, it is a principal object of the present invention to provide a printing recorder of the type referred to above which is capable of recording on an invoice, or other card, not only the customary information from the usual customer's credit card, but also information as to the amount of sales both in numerical form and in coded form; the printed code will be in such form as may be read automatically by appropriate means for accounting purposes at a later time.

It is another important object of the present invention, as indicated above, to provide a printing recorder having a means for simultaneously printing the numerical value of the sale and a coded representation of this same amount.

It is another important object of the present invention to provide a punching converter for use in conjunction or combination with the printing recorder for the purpose of translating the information in the form of the printed code into a punched code.

Other and further objects and advantageous features of the present invention will hereinafter more fully appear when considered in connection with a detailed description of the drawings wherein.

Figure 1:
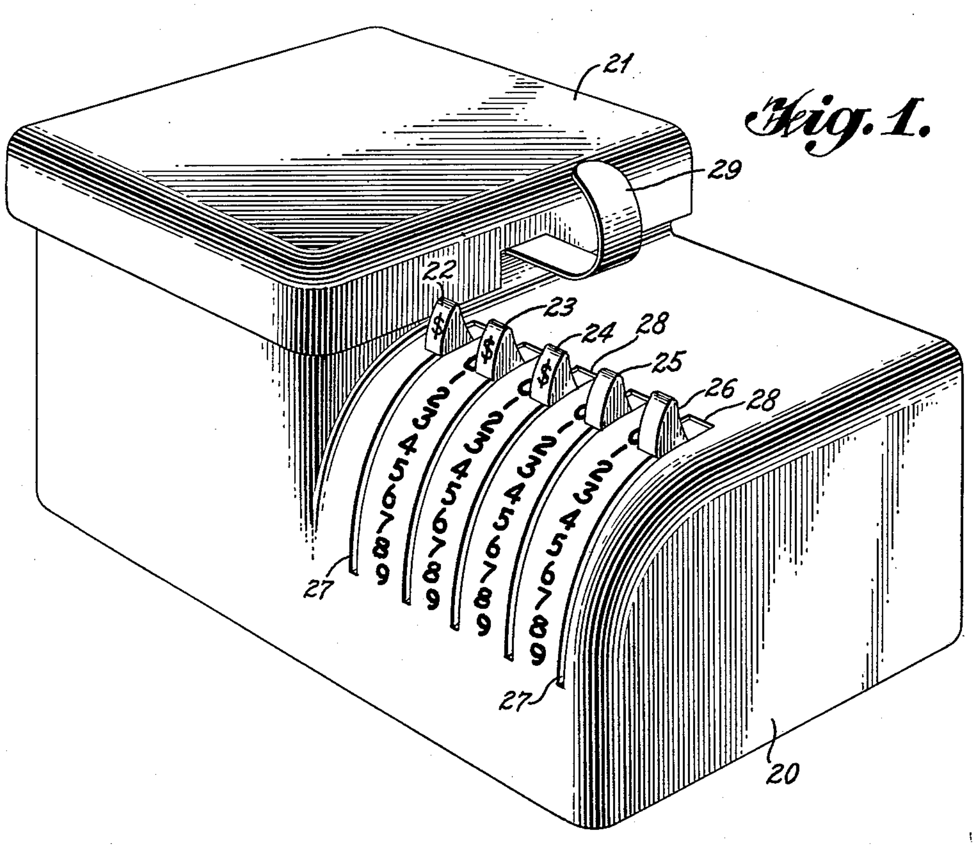
FIGURE 1 is a perspective view of the printing recorder of the present invention.

Referring to the drawings in detail, FIGURE 1 shows a printing recorder having a substantially rectangular housing 20 upon which is mounted a cover or lid 21. Projecting outwardly from the housing 20 are a series of handles 22, 23, 24, 25 and 26 which are attached to the ends of levers, as will hereinafter appear, the latter being movable within the housing. These handles 22 to 26, inclusive, are movable in an arcuate direction by virtue of the slots 27 which are provided in the housing 20. A series of printed numerals is located on the outer surface of the housing between each pair of adjacent slots 27 for the purpose of determining the position of each individual lever handle. Also, housing 20 is provided with a plurality of rectangular windows or openings 28 at the upper ends of the slots 27 for the purpose of providing a visual indication (through the window) of the number opposite which the given lever handle is located. As will hereinafter appear, this visual indication is provided by means of arcuate number plates which are attached to the same levers upon which the lever handles are mounted. An operating lever 29, is also shown as projecting horizontally from the lid 21. As will hereinafter appear, this operating handle 29 is attached to a roller system for the purpose of urging the rollers over a suitable invoice for printing the various information on the invoice.

Figure 2:
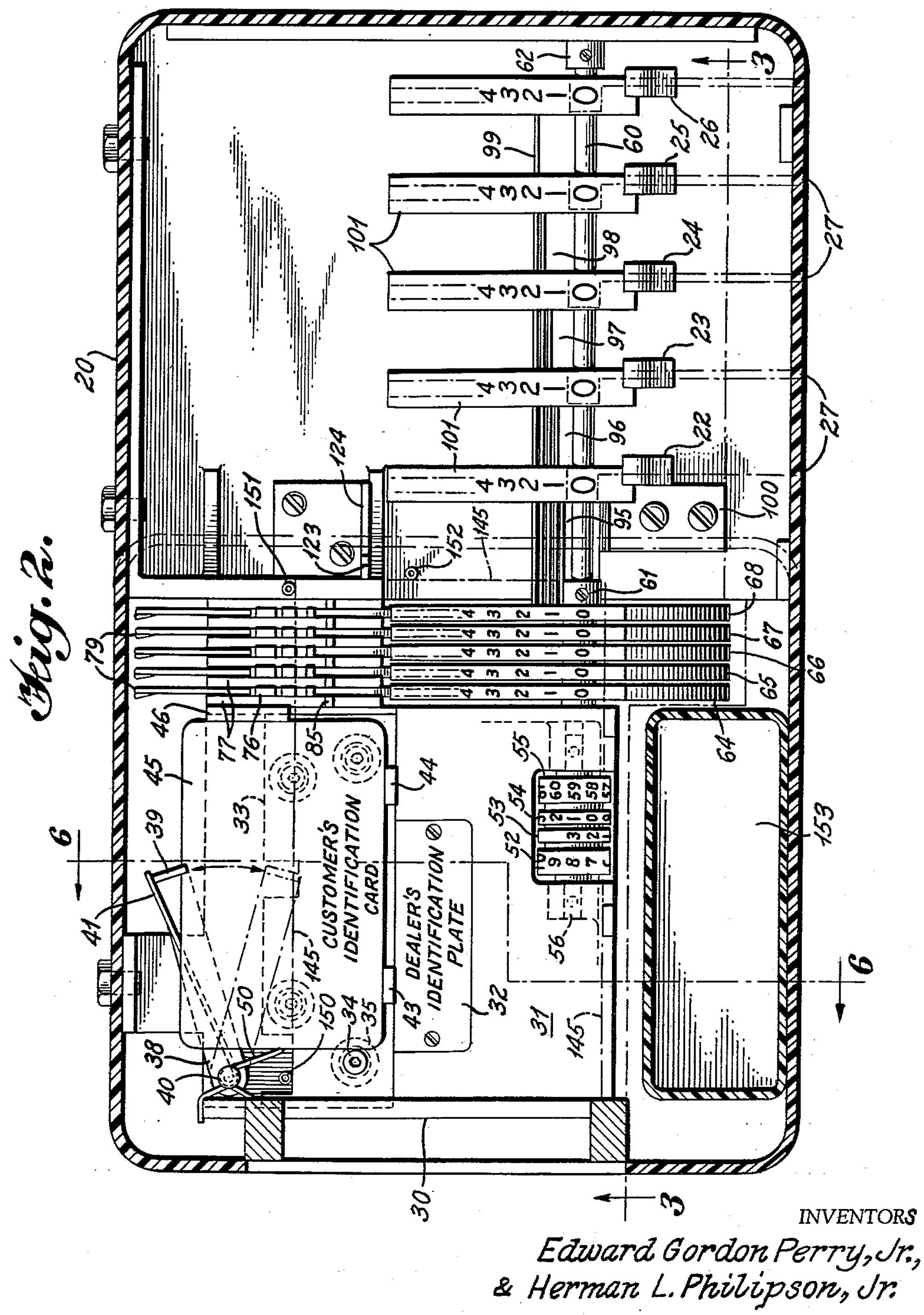
FIGURE 2 is a horizontal section showing the printing recorder of the present invention as it would appear from above with the upper part of the casing broken away and minus the cover upon which the roller is mounted.
Figure 3:
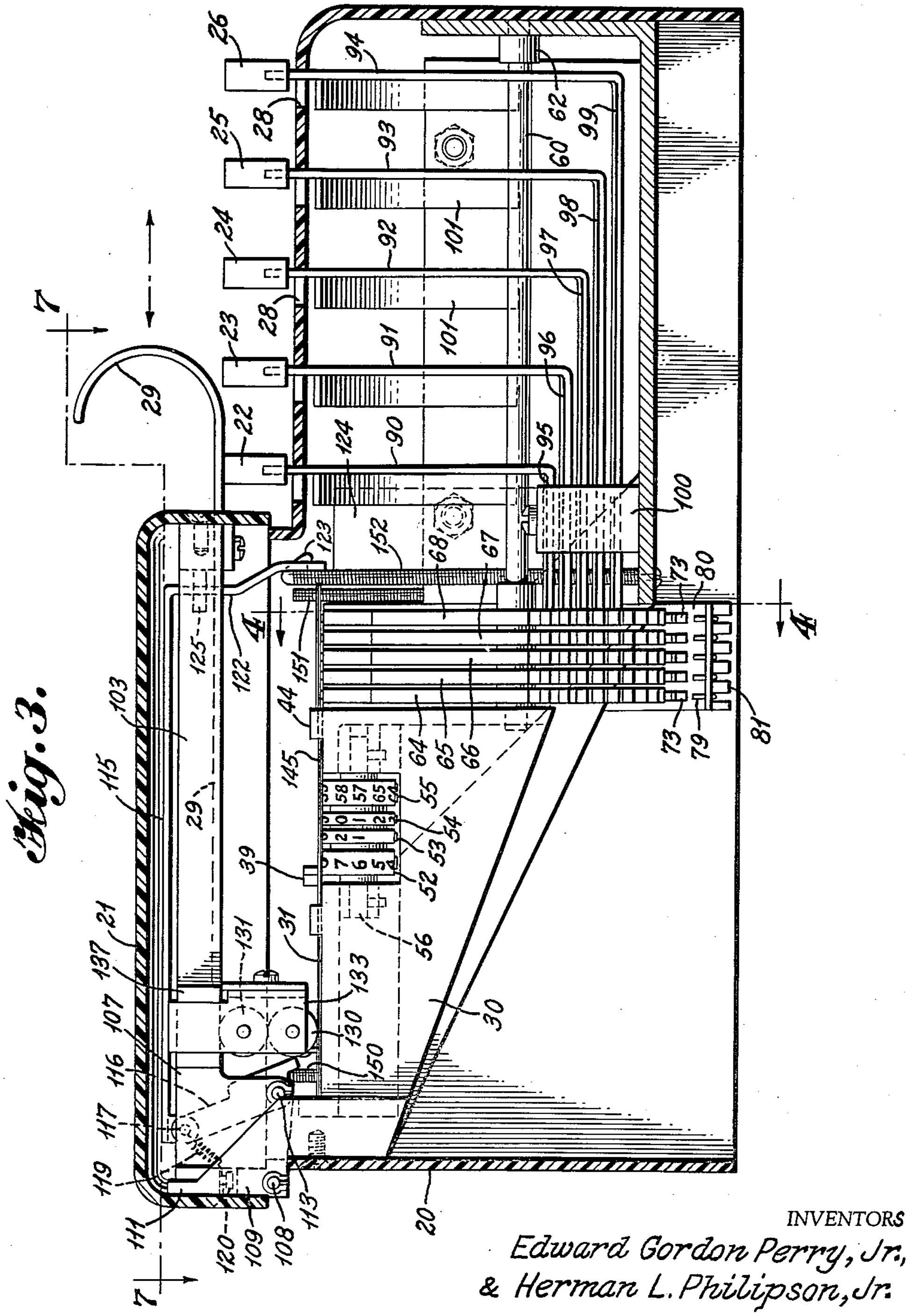
FIGURE 3 is a vertical section taken along section line 3—3 of FIGURE 2.
Figure 6:
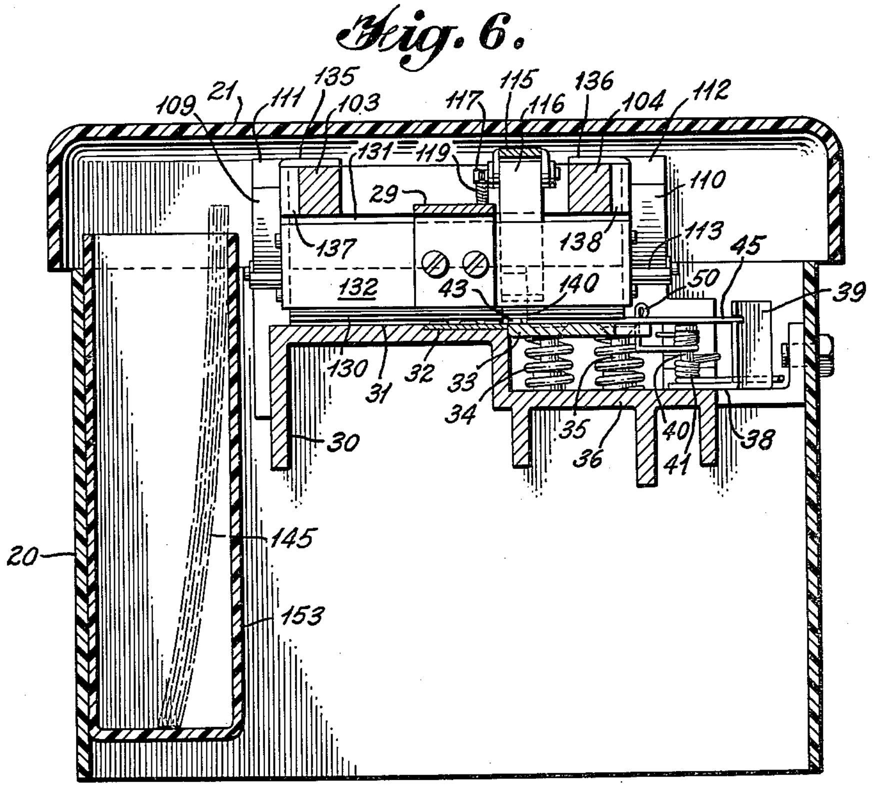
FIGURE 6 is a cross-section taken along section line 6—6 of FIGURE 2 showing details of the roller mechanism and the card support platform.

Referring now to FIGURES 2, 3 and 6, the housing has associated therewith a base 30 which is provided with an upper flat surface 31 constituting the printing field. The various numbers, letters and other characters, which project above the surface 31 will be considered as being in the printing field. The surface 31 is provided with a suitable depression in which is mounted a dealer's identification plate 32. This dealer's identification plate will, of course, indicate, in the form of raised letters, the name and address of the dealer or vendor who will be using the printing recorder of the present invention. Since the dealer's identification plate will form a semi-permanent part of the recording printer, the same will be suitably screwed or bolted to the base 30.

A card support platform 33 is mounted to one side of the surface 31 adjacent the dealer's identification plate 32. This card support platform is spring mounted with respect to the base 30 by means of springs 34 which surround bolts 35. The bolts 35 are secured at their upper ends to the card support platform 33 and are slidable at their lower ends in the rear extension 36 of the base 30. The purpose of mounting the card support platform 33 on springs is to provide for uniform printing pressures even though credit cards of several thicknesses may be used.

A card locater arm 38 having a vertically extending notched portion 39 is pivotally mounted on pivot pin 40 and is spring urged by means of spring 41 in a clock-wise direction.

The card support platform 33 is provided with a pair of upwardly projecting lips 43 and 44 (see especially FIG. 2). The purpose of the lips 43 and 44 is to properly align the bottom edge of a customer's identification card, such as card 45, which is placed on the card support platform 33. The righthand edge (as it appears from FIG. 2) of the card 45 is held against a vertical flange 46 which projects upwardly from the base 30. The upper edge of the card 45 is held in position by virtue of the fact that it fits into the notch in the vertical portion 39 of the locater arm 38 which, as indicated heretofore, is urged in a clockwise direction by means of the spring 41. Another spring 50, which is also mounted on the pivot pin 40, bears against the left-hand edge of the identification card 45.

From the above it can be seen that the customer's identification card 45 is supported in position along the four edges of the card. However, since the arm 38 and spring 50 are resiliently urged against the card 45, it should be apparent that a card of greater or lesser size than the one shown in FIG. 2 might be placed on the card support platform 33. The customer's identification card 45 will, of course, have the usual raised information concerning the customer's name and identification number, all of which will project into the printing field.

A series of dating rollers 52, 53, 54 and 55 are rotatably mounted on an axle 56 which is supported in the base 30. These dating rollers 52 to 55, inclusive, have thereon raised letters corresponding to the month, day and year and may be moved by hand, so as to present the proper date in the form of raised numerals in the printing field above the surface 31.

Figures 4, 5:
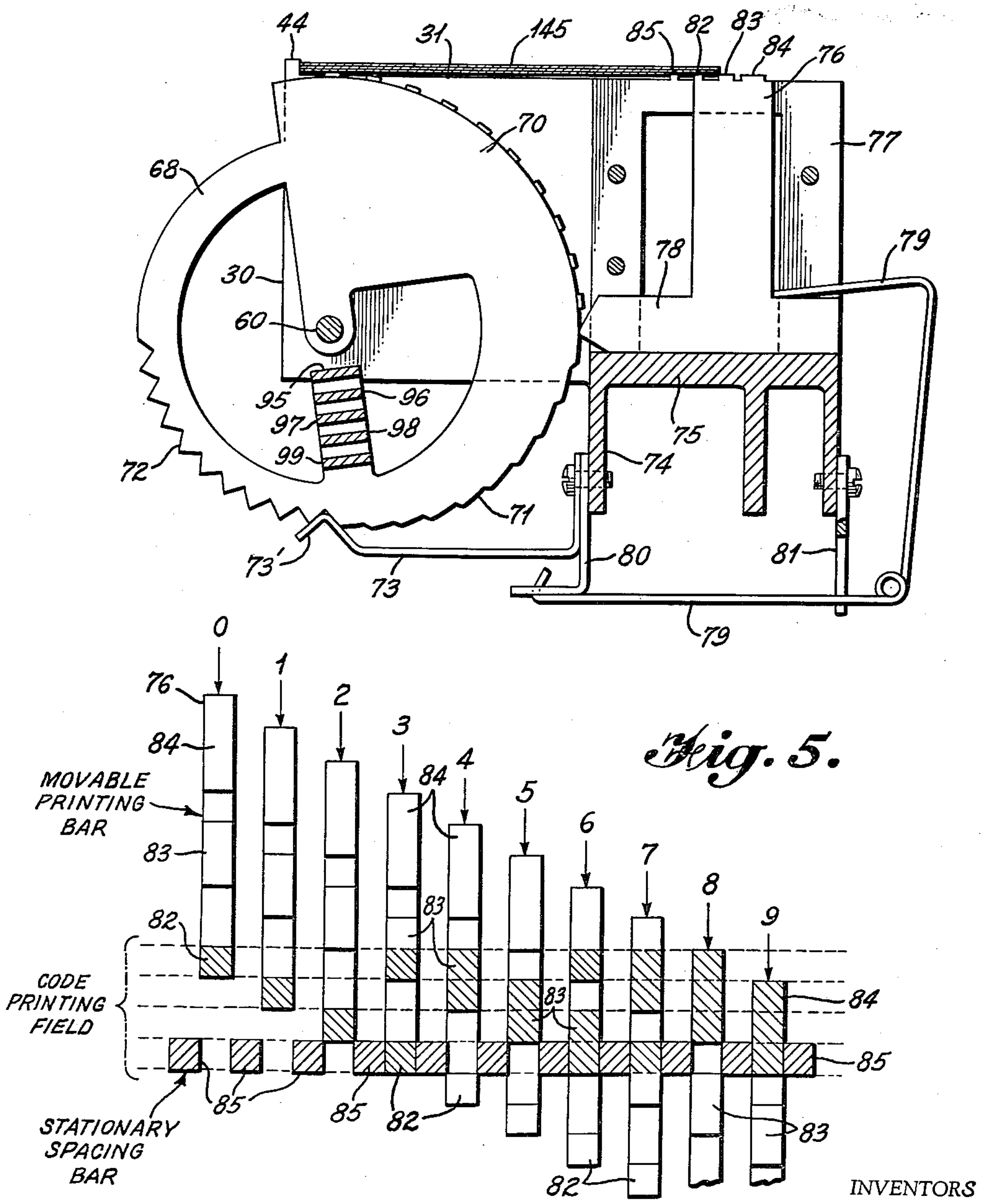
FIGURE 4 is a cross-section taken along section line 4—4 of FIGURE 3, showing the details of the printing wheels (or discs) and the associated vertical printing bars (or plates)
FIGURE 5 is a semi-diagrammatic view showing various positions of the movable printing bar (or plate) as the same is moved with respect to the "code printing field"

A horizontal rod or axle 60 is suitably supported in the housing 20 by means of bushings 61 and 62. As best shown in FIG. 2, a plurality of printing wheels or annular discs 64, 65, 66, 67 and 68 are freely rotatably mounted on the left hand end of the rod 60. Turning now to FIG. 4, printing disc 68, which has the same outer configuration as the remaining printing discs, has its peripheral edge divided into three sectors 70, 71 and 72. Sector 70 has raised numerals arranged in spaced relation and indicating from 0 to 9 consecutively. By appropriate rotation of the printing disc 68, anyone of the 10 numerals may be selectively positioned within the printing field above the surface 31. The sector 71 is a cammed surface which is preferably, but not necessarily, divided into a series of steps corresponding in number to the numerals in the sector 70. Sector 72 is provided with a series of notches which correspond in number to the numerals in sector 70. A leaf spring 73 (one such leaf spring being provided for each printing disc), is secured to one side of the sub-base 74 within the housing. The free end of each spring 73 is provided with a V-shaped projection 73' which is adapted to engage selectively the individual notches in the sector 72 such that when a given printing disc, for example, disc 68, is moved to present a particular numeral in the printing field, the relation between the spring 73 and the notches of the sector 72 is such as to retain this particular numeral in the printing field until the printing wheel or disc is subsequently moved.

The upper portion of the sub-base 74 comprises a substantially flat slide plate 75 upon which are slidably mounted a plurality of vertically extending printing plates (or bars) 76, one such printing plate being associated with each printing disc. Between each adjacent pair of printing plates 76 a stationary spacer plate 77 is located. Each printing plate 76 is provided with a horizontally extending portion 78 which is adapted to bear against the cammed portion 71 of the corresponding printing disc. Each printing plate 76 has associated therewith a hair pin type spring 79 which is suitably bent in the manner shown in FIG. 4. The upper end of each spring 79 bears against the printing plate 76 and the lower left-hand end of the spring 79 is suitably bent over a support 80 attached to the sub-base 74. There are as many springs 79 as there are printing plates 76 and thus, a spacing device 81 attached to the sub-base 74 permits separation of the springs intermediate their ends.

Each printing plate 76 is provided at its upper end with three raised blocks 82, 83 and 84 which are adapted to project into the printing field.

Block 82, in horizontal cross-section, is substantially square and for the purposes of the explanation which appears hereinafter, the size of the block 82 will be considered as the reference unit for the printed code. Block 83 is a single unit in width but is two units in lengths and is spaced two units from the block 82. Similarly, block 84 is a single unit in width but it is three units in length and is separated from block 83 by a single unit of space.

Each stationary spacer plate 77 is provided with a raised block 85 which is of the same size as block 82 and which projects upwardly into the printing field.

As best appears in FIGURE 3, a plurality of levers 90, 91, 92, 93 and 94, are rotatably mounted, in spaced rotation, on the right-hand portion of the rod 60. The outer ends of these levers project through the slots 27 in the housing 20 and are attached at their ends to the lever handles 22 to 26, inclusive, respectively. The opposite ends of the levers 90 to 94 project beyond the rod 60 in varying degrees, and these projecting ends are connected to horizontal arms 95, 96, 97, 98 and 99, respectively. The horizontal arms are connected to inwardly directed radial extensions on the printing discs 64 to 68, inclusive, respectively. A suitable stop 100 mounted within the housing is positioned in the path of movement of the arms 95 to 99 inclusive so as to prevent movement of the levers 90 to 94 inclusive beyond the zero point.

A plurality of arcuate number plates, each designated by the reference numeral 101, are attached to each of the levers 90 to 94, inclusive, adjacent the location where each lever is attached to each respective handle. Each arcuate number plate, however, is positioned within the housing 20 such that it is not visible except for those portions which are below the windows 28.

Figure 7:
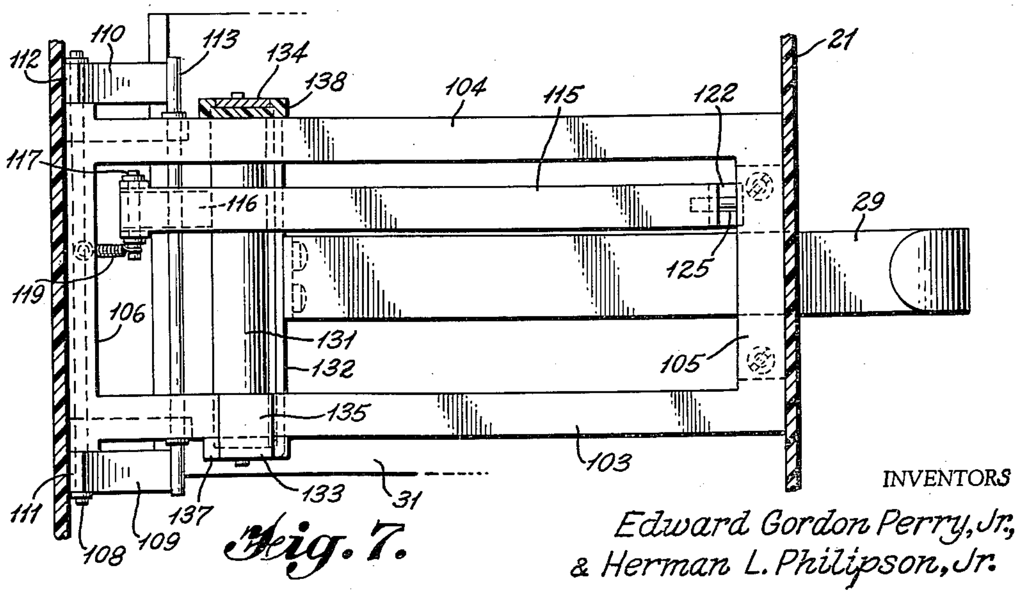
FIGURE 7 is a cross-section taken along section line 7—7 of FIGURE 3 showing the details of the means for supporting the rollers.

As best shown in FIGURES 3, 6 and 7, the cover or lid 21 is secured by screws at its opposite ends to pair of spaced supporting arms 103 and 104, which are connected at their right-hand ends (see FIG. 7) by cross bar 105. Arms 103 and 104 are also connected at their left-hand ends by means of cross bar 106. As shown in FIGURE 3, the horizontal arm 103 is provided with a downwardly projecting vertical flange 107. Arm 104 is provided with a corresponding flange (not shown). A pivot rod 108 passes through suitable holes in the vertical flanges at the left-hand ends of arms 103 and 104 and also through corresponding holes in flanges 109 and 110 which project upwardly from the base 30. Flanges 109 and 110 are provided with ears 111 and 112 respectively. A second rod 113 which also passes through the flanges at the left-hand ends of the arms 103 and 104 extends outwardly from the sides of these arms so as to bear against the ears 111 and 112 when the lid 21 and the arms 103 and 104 are pivoted about the rod 108 to a vertical position. Thus the ears 111 and 112 and rod 113 constitute a stop means for preventing the cover from being rotated more than about 90° with respect to housing 20.

A latch-operating arm 115 is pivotally mounted, at one end, on the upper end of a trip lever 116 by means of pivot pin 117. The lower end of the trip lever is mounted for pivotal movement on the rod 113. The trip lever itself is spring biased in a counter-clockwise direction by means of spring 119 which connects from the pivot pin 117 to a screw 120 in the cross bar 106. The right-hand end (as it appears in FIG. 3) of the latch-operating arm 115 is provided with a downwardly projecting extension 122. This extension 122 is provided with a hole in which is received the tongue of a latch plate 124, the latter being suitably secured to the frame of the recorder. A pin 125 projects towards the left from the cross bar 105 and into a corresponding hole in the latch arm 115 for the purpose of securing the right-hand end of the arm 115 in position when the cover 21 is closed.

A pair of rollers 130 and 131, arranged in vertical relation are suitably supported from the arms 103 and 104 by a yoke arrangement. This yoke consists of a transverse vertical plate 132 which is attached intermediate its ends to the left-hand end of the operating arm 29. Transverse plate 132 is bent at its end to provide end portions 133 and 134 which, inturn, are bent over at their upper ends to form horizontal portions 135 and 136 overlying the supporting arms 103 and 104, respectively. For the purpose of decreasing frictional contact, nylon blocks 137 and 138 are located between the end portions 133 and 134 and the sides of arms 103 and 104, respectively. The lower roller 130 is provided with a suitable annular grove 140 so as to permit the passage of this roller over the lips 43 and 44 on the card supporting platform 33.

The relationship between the two rollers, the yoke 132 and the two arms 103 and 104 is such that the upper surface of the upper roller 131 bears against the under surface of the arms 103 and 104. Also the rollers 130 and 131 are in driving relation with respect to each other. Thus, if the operating arm 29 is drawn a horizontal direction to the the right, as it appears in FIGURE 3, the upper roller 131 will be driven by its contact with the arms 103 and 104, the upper roller, in turn, will drive the lower roller so as to facilitate the printing operation.

Figure 8:
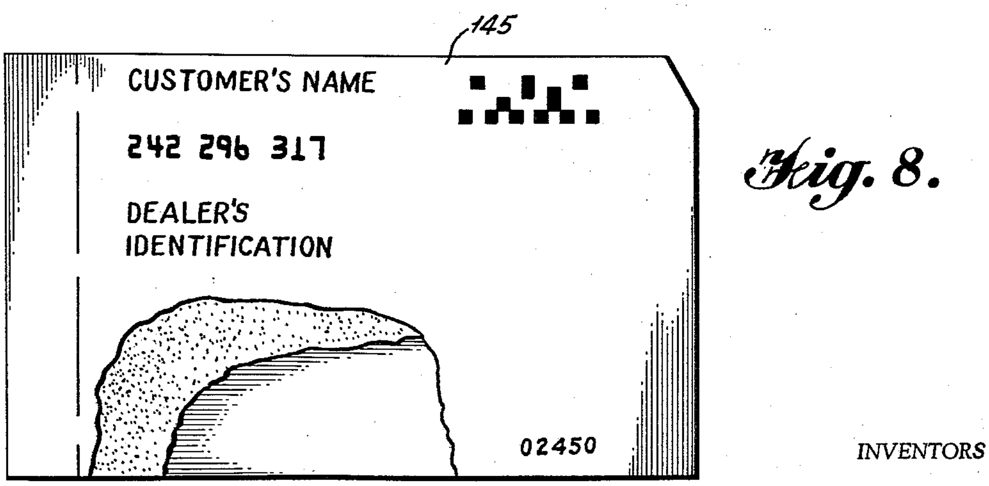
FIGURE 8 is a plan, view with certain parts broken away, of a typical invoice adapted for use in the printing recorder of FIGURE 1 and showing the same after the information has been imprinted thereon.

In FIGURE 8 there is shown an invoice which will comprise several sheets one of which may be a card, with the adjacent sheets interleaved with carbon paper.

The cover 21 can be opened by pulling on the handle 29 or by pushing the same towards the cover. In either case the latch-operating arm 115 will be moved so as to disengage the portion 122 from the tongue 123. That is, from a consideration of FIGURE 3, if the operating arm 29 is moved to its extreme right-hand position, the yoke portion 132 will urge the vertical portion 122 of the arm 115 toward the right so as to disengage the tongue 123 from the corresponding hole in the vertical portion 122. On the other hand, if the operating arm 29 is urged to its extreme left-hand position, the roller 130 will engage the lower edge of the trip lever 116 so as to pivot the same in a clockwise direction and effect the same result.

Assuming that a total purchase of $24.50 has been made, the cover 21 is opened and the customer's identification card 45 is inserted in the proper position by turning the locater arm 38 in a counter-clockwise direction. Thereafter, the locater arm 38 and the spring 50 will hold the card in the proper position as indicated heretofore. A suitable invoice such as shown in FIGURE 8 is then superimposed over the customer's identification card and on the printing field which is defined by the surface 31. The handles 23, 24 and 25 are moved to positions corresponding to the numerals two, four and five, respectively while the handles 22 and 26 are left in the zero position. Thereafter, the cover 21 is closed and latched and the handle 29 is drawn towards the right, the roller 130 passing over the invoice and pressing it against the various numbers, letters, and characters which are now in the printing field. The cover may be opened in the manner indicated above and the invoice and customer's identification card removed.

As shown in FIGURE 8 the information imprinted thereon would be representative of information afforded by the printing recorder of the present invention. The numerical value of $24.50 appears in the lower right hand corner of the invoice 145.

As it appears in FIGURES 2 and 4 (see also FIGURE 5), the stationary spacer bars or plates 77 each have raised blocks 85 which are all in alignment and which represent a base or reference line that remains fixed regardless of the positions of the various printing discs. A "code printing field," which is a portion of the general printing field, will be defined in terms of the line including the impressions formed by the stationary spacing bars or plates plus the three additional lines included above it. Thus, each vertical information line or character can be considered as a series of four blocks which may be either black or white. In essence, therefore, the printed code will be a four-position binary code.

As shown in FIGURE 5, the left-hand printing plate 76 will be in the zero position such that only the raised block 82 will be in the code printing field. The double-unit block 83 and the triple-unit block 84 will be out of the code printing field. If a given printing wheel is moved now so that the raised numeral "1" is presented to the printing field, the end 78 of the movable printing plate 76 will bear against a different portion of the cammed surface 71 such that the printing plate 76 will be moved closer towards the rod 69. Thus the raised block 82 in the corresponding printing plate 76 will be advanced one position further into the code printing field as indicated in FIGURE 5. In the number "3" position the raised blocks 82 are in alignment with the adjacent raised blocks 85 of the stationary spacer plates while the lower unit of the block 83 has moved into the code printing field. In the position corresponding to the numeral 4, the raised block 82 has moved beyond (or below) the code printing field and now both units of the block 83 have moved into the code printing field, etc.

Invoice locating fingers 150, 151 and 152 bear against the edges of the invoice to hold the same in position. These invoice locating fingers are in the form of stiff coil springs which are threadably mounted over suitable screws which project upwardly through the framework of the recorder.

Returning again to FIGURE 8, the blocks in the upper right-hand corner of the invoice 145 are coded representations of the same numerical value appearing below in the lower right-hand corner of this same invoice. The upper sheet of the invoice may be torn off and given to the customer. The lower sheet, preferably in the form of a card is retained for accounting purposes.

The housing 20 is also provided with an internal receptacle or pocket 153 for holding therein invoice blanks.

Figure 9:
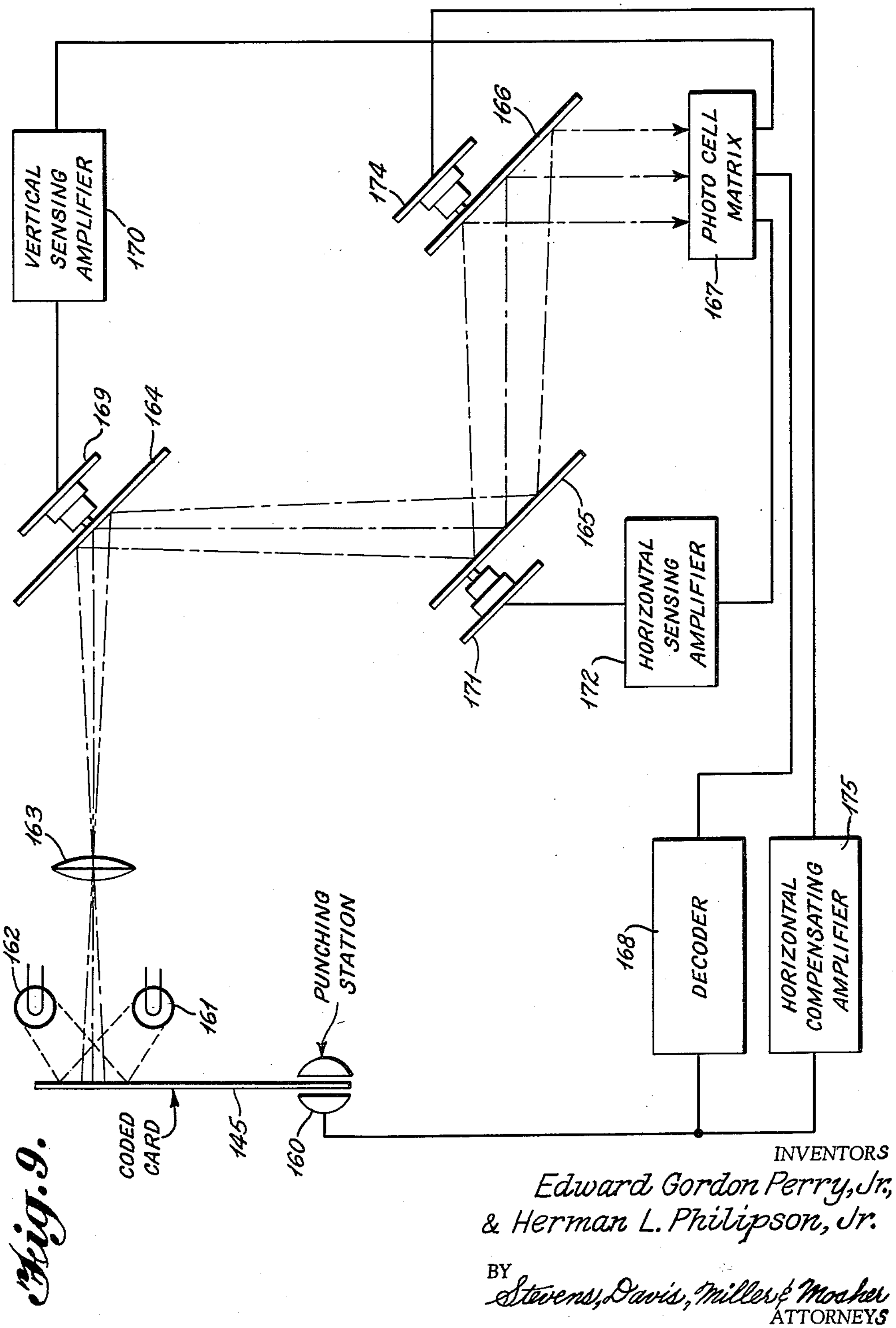
FIGURE 9 is a semi-diagrammatic view of one embodiment of the punching converter of the present invention.

Referring now to FIGURE 9 and to FIGURES 10*a* to 10*d* inclusive, these figures typify a diagrammatic representation of the punching converter of the present invention. For example, referring to FIGURE 9, a coded card such as invoice 145 which has been suitably imprinted with the information shown in FIGURE 8, is positioned in a punching station 160 such that a portion of the card is adapted to be perforated by the punching apparatus at the punching station. A pair of illuminating lamps 161 and 162 are provided for the purpose of illuminating that portion of the coded card where the coded information (such as appears in the upper right-hand corner of FIGURE 8) is located. A suitable lens 163 is adapted to project the coded image from the card 145 to the surface of an inclined mirror 164 which in turn projects the image downwardly to a second inclined mirror 165. The second inclined mirror reflects the image in a horizontal direction to a third mirror 166. The third mirror 166 reflects the image in a downward direction to a photo cell matrix 167.

The photo cell matrix, which is diagrammatically illustrated in greater detail in FIGURES 10*a* to 10*d*, inclusive, will receive the information provided by the lens and mirror system and will pass this information into a decorder 168 which will then actuate the punching apparatus at the punching station 160 in accordance with the information supplied to it from the photo cell matrix 167.

The above described system also includes a vertical mirror drive 169 for the purpose of adjusting the first mirror about a horizontal axis (preferably along the lower edge of the mirror). The information required for moving the first mirror 164 is obtained from the photo cell matrix through a vertical sensing amplifier 170 which controls the operation of the mirror positioning apparatus 169. Similarly, the second mirror 165 is provided with an apparatus 171 for adjusting this mirror about a vertical axis. This information is also supplied from the photo cell matrix to a horizontal amplifier 172. The purpose of the two means 169 and 171 is to insure that the image received by the photo cell matrix is properly oriented with respect to the individual components of the photo cell matrix.

The third mirror 166 is provided with a positioning apparatus 174 which turns this mirror about a vertical axis. However, this third mirror is driven in accordance with the movement of the coded card 145 from one punching position to the next successive punching position within the punching station. The information for controlling the operation of the mirror positioning apparatus 174 is sent back from the punching station through the compensating device 175.

A simplified form of the apparatus shown in FIGURE 9 would result if the third mirror 166 and its associated control device 174 were eliminated and its position occupied by the photo cell matrix 167. This would also eliminate the compensating means 175. Thus, the photo cell matrix 167 would be operating in conjunction with but two mirrors, i.e., mirrors 164 and 165.

The requirements of the optical system are merely that it should be capable of projecting the image of the coded characters onto the photo cell matrix with sufficient enlargement to make each discreet area of the coded character of such a size that the particular photo cell in the matrix associated with that discreet area would be conveniently contained within said area. Thus, a simple convex lens of appropriate focal length will achieve this purpose.

Because of unavoidable variations in the location of the coded characters from card to card, it is necessary to provide corrective means to insure that the projecting image is correctly positioned on the photo cell matrix. To this end, two movable mirror systems are provided. Thus, mirror 164 is arranged to make corrections for variations in the vertical positioning of the coded characters. The second mirror 165, is for horizontal positioning. The vertical mirror is pivotally fastened to its associated driving device 169, the axis of motion being the horizontal bottom edge of said mirror. The mirror 165 is similary fastened to its driving device 171 but the axis of motion is vertical, being one of the side edges of said mirror.

Each mirror has associated therewith a mechanism responsive to electrical signals to provide the driving force necessary to move the mirror pivotally about its hinged edge.

Two methods have been found to be particularly effective in providing the driving force required, but any means responsive to electrical signals could be utilized without departing from the scope of this invention. One such means, for example, is to provide a connection between the free edge of each mirror and a coil which is movably supported, parallel to its axis, within the field of a permanent magnet, in much the same manner as the voice coil of the permanent magnet type of loudspeaker is supported within the speaker. This type of magnet and coil mechanism is commercially available. With this arrangement, each mirror will have a central "rest" position when "no signal" is applied to the driving mechanism such that displacement to either side of this rest position may be obtained by applying a voltage of proper polarity to the movable coil. When the driving voltage is removed, the coil, with mirror attached, will be returned to its rest position by the restoring tendency of the coil suspension.

Another method for providing the mirror drive force differs only in that the coil to which the mirror is attached may be slidably positioned in the magnetic field rather than suspended in said field by means which tend to exert a restoring force to said coil. Due to the lack of a restoring force, the coil and its attached mirror tend to remain in whatever position to which they are displaced by the effect of the driving voltage until such time as a signal of opposite polarity is applied to return the coil and mirror to a neutral position.

Except for the problem of positioning the code on the photo cell matric, said matrix means consists essentially of four photo cells arranged linearly, each cell being used to send the printed or unprinted condition of each of the four discreet areas of the code character. However, since there is a problem of positioning, additional means must be provided for sensing incorrect positioning. This is most easily done by adding position-sensing photo cells to the code matrix such that, when a code character is projected on to the matrix in an incorrect manner, a correcting signal will be created to adjust the angle of the proper mirror to correctly position the code character on the "reading" photo cells.

Sensing of improper positioning may be accomplished in a number of ways. Vertical positioning may be most conveniently brought about by sensing the position of zero reference characters printed alternately with the individual code characters. These zero reference characters are the blocks that are provided by the raised portions 85 on the stationary spacer plates.

Figure 10A:
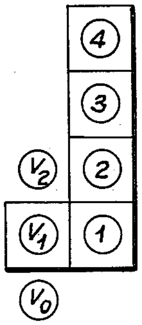
FIGURES 10*a* to 10*d*, inclusive, are semi-diagrammatic views representing various different embodiments of the photo cell matrix which is shown in FIGURE 9.

Referring now to FIGURE 10*a*, it will be assumed that the photo cells designated by the reference numerals 1, 2, 3 and 4 correspond to the four discreet areas of the coded characters. Photo cells $V_0$, $V_1$ and $V_2$ are provided for sensing the position of the zero reference characters. The initial position of mirror 164 will be adjusted to represent the maximum downward deviation which can be anticipated. Thus, if none of the vertical sensing photo cells $V_1$, $V_2$ or $V_0$ have a darkened image of the reference character falling over them, the mirror 164 will be moved until a zero reference character is finally reflected on to photo cell $V_0$. Thereafter, the mirror is driven one step further until the reference character falls on $V_1$ which represents the proper position.

Later, if further characters are advanced past the reading station such that a zero reference character might fall upon photo cell $V_2$, due to the misalignment of individual code groups within a single series of printed characters, the image would be driven downward until the reference character falls again on $V_1$. Thus, the only condition which will satisfy the vertical system, is that in which the photo cell $V_1$ is in a darkened area and the photo cells $V_0$ and $V_2$ receive the full reflected light from the card.

Figure 10B:
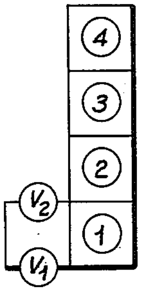

Another system for vertical positioning is shown in FIGURE 10*b* where only two vertical positioning photo cells $V_1$ and $V_2$ are employed. The satisfying condition in this case would be that the output of the two cells be equal. If photo cell $V_2$ received more light than $V_1$ and hence produced a greater electrical output (indicating a downward displacement of the code character the mirror 164 would be driven to bring the image upward until the outputs of the two photo cells were again equal.

Horizontal positioning may be accomplished essentially in the same way and may be employed simultaneously with the vertical positioning. The only difference is that there is no "horizontal reference character" to assist in the horizontal positioning. The positioning of the coded numerals themselves must be sensed to effect correct positioning. Since it is not possible to predict which of the four discreet areas of the code character may or may not be printed, no single area can be used for sensing purposes. However, it will be noted that in any given code character at least one of the top three areas in utilized.

Figure 10C:
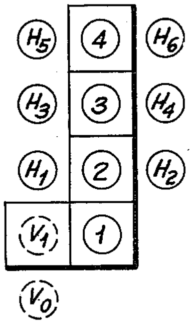

Hence, horizontal positioning can be effected by using three pairs of photo cells, each pair being associated with one of the three upper code areas and arranged as indicated in FIGURE 10*c*. It should be noted that the photo cell indicated as $H_1$ would necessarily be located in the same place as $V_2$ in the vertical system diclosed in FIGURE 10*a*. Thus whereas the system of FIGURE 10*c* is entirely adequate for the purposes of horizontal positioning, it would not be practical to combine the system with that of 10*a* since a single photo cell would be unable to differentiate simultaneously between errors in vertical positioning and errors in horizontal positioning.

Figure 10D:
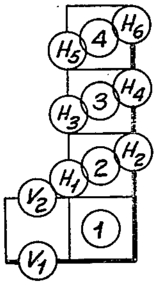

FIGURE 10*d* represents an arrangement whereby the means for compensating vertically is combined with that for compensating horizontally. In this embodiment the photo cells are located on the boundaries of the various areas involved. Thus, horizontal positioning is effected by arranging the photo cells in pairs and by requiring that each photo cell in each pair be exposed to an amount of light which is equal to that of the other photo cell in the same pair; i.e., the output of $H_1$ must be equal to that of $H_2$, $H_3$ to that of $H_4$, and $H_5$ to that of $H_6$. The vertical positioning of the reference characters is effected by $V_1$ and $V_2$, substantially in the same manner as described above in relation to relation to FIGURE 10*b*. It is seen that regardless of which of the three upper most code areas are filled in any given character, if that particular character is properly positioned on the matrix, each photo cell of the horizontal positioning system will receive the same amount of reflected light as its mate in the pair concerned. If an area is not used in the particular code character each cell of the pair will receive the full reflected light from the card and there will be no unbalance in their outputs. On the other hand, if that area is used, each cell will be partially in the darkened image and in such a manner that a balanced output will still be produced.

The only remaining problem regarding positioning is that introduced by the advancing of the card as each code character is read and punched into the card. In the absence of some preventive means, it should be apparent that the horizontal positioning system would tend to follow the first character read as the card is advanced one space forward. This may be avoided, first of all, by providing means for disabling the positioning system during the advance of the card. Then, when the advance is complete, the positioning system can be re-enabled and the mirror will lock the next code character into proper position on the matrix. The next character should be approximately correct after the advance of the card in the punching station because the spacing of code characters is very nearly equal to the spacing of the columns on the standard card punching machine.

However, because it is inconvenient to make the code character and column spacings exactly equal and, further, because the accumulated error for which the horizontal positioning system must compensate becomes so large in multi-digit coded numbers as to exceed the compensating capabilities of said system, it has been found desirable to include separate means to compensate for the aforesaid difference in character and column spacing. It is for this reason that a third movable mirror, such as mirror 166, is provided together with its positioning means 174. The drive means 174 will shift the mirror a small fixed amount concurrently with each advance of the card being read in the punching station. This shift is adjusted exactly to equal the difference in code character and punch column width such that each code character will fall successively in the exact location as the preceding character, thus considerably lessening the action required of the horizontal postioning system.

Of course, some means must be provided to translate the reading photo cell outputs into a form suitable for the actuation of the card punch machine. This may be accomplished by any of several methods well known to those skilled in the art. However, in order to allow the machine to operate at its highest possible speed, it would seem most practical to use electronic means including a diode matrix with the necessary accompanying circuitry. Thus, each reading photo cell output would be amplified by conventional means and applied to an appropriate "trigger" circuit, the output of which would be used to trip associated "flip-flop" circuits. By conventional means, a diode matrix would be employed to sense the condition of the "flip-flop" and energize a specific output lead corresponding to any particular digit read by the photo cell. Thereafter, the energized output lead could be used to "fire" a thyratron tube circuit. Obviously, the plate circuit of the thyratron tube could be easily employed to accuate the card punching machine, thus perforating the cards in accordance with the coded number "read" from the card.

Whereas the present invention has been described herein with particular relation to the drawings attached hereto, it should be understood that other and further modifications, apart from those shown and suggested herein, may be made within the spirit and scope of this invention.

What is claimed is:

1. A printing recorder comprising a housing, a base mounted in said housing and having a substantially flat surface defining a printing field, means associated with said base for holding embossed and debossed cards on said flat surface and in said printing field, means for holding invoices over said surface and in said printing field, a horizontal rod mounted in said housing substantially parallel to said surface of said base, a plurality of annular discs rotatably mounted on said rod, each annular disc being provided with a first arcuate sector at its peripheral edge with a plurality of spaced and raised numerals adapted to project selectively into said printing field, a second arcuate sector disposed adjacent said first arcuate sector on each of said annular discs, progressive and adjacent peripherally disposed cam step means on said second sector, a linearly slidable printing plate disposed adjacent each of said annular dics and having raised code printing elements thereon extending into said printing field, said housing having spring means maintaining said slidable printing plates in contact with said cam step means on said annular discs, a plurality of means laterally spaced from said plurality of annular discs rotatably mounted on said horizontal rod and each connected to one of said plurality of annular discs for rotating each disc individually, peripheral detent notches in another sector of each annular disc, positioning means mounted in said housing yieldably engageable with one of said detent notches of each one of said rotatable annular discs, and a roller movable over said invoice for pressing the latter against said printing field.

2. A printing recorder comprising a housing, a base mounted in said housing and having a substantially flat surface defining a printing field, means associated with said base for holding embossed and debossed cards on said flat surface and in said printing field, means for holding invoices over said surface and in said printing field, a horizontal rod mounted in said housing substantially parallel to said surface of said base, a plurality of annular discs rotatably mounted on said rod, each annular disc being provided with a first arcuate sector portion having along its periphery a plurality of spaced and raised numerals adapted to project selectively into said printing field, each said annular disc having a second arcuate sector portion forming a peripheral cammed surface, said cammed surface including adjacent camming surface progressively spaced from the axis of said horizontal rod a substantially flat slide plate mounted adjacent said rotatable discs, a plurality of vertical printing plates slidably mounted on said slide plate, each vertical printing plate being associated with a corresponding one of said rotatable annular discs and having thereon a horizontally extending portion bearing at its end against the cammed surface sector of the said one corresponding rotatable annular disc, actuating spring means engaging each of said vertical printing plates for moving and maintaining the said end of the horizontal extension of each vertical printing plate resilient against the peripheral, arcuate, cammed sector surface of each of said corresponding annular rotatable discs, the linear movement of each said vertical plate being limited to the radial spacings between said cam surfaces on said annular disc, each vertical printing plate having at its upper end a series of spaced and raised blocks projecting into said printing field, non-coplanar means for rotating each disc individually, and a roller movable over said printing field for pressing said invoice against said printing field, whereby said numerals will imprint a numerical value on said invoice and said raised blocks will imprint a code on said invoice corresponding to said numerical value.

3. A printing recorder as set forth in claim 2 including a fixed and vertically extending spacer plate between each adjacent pair of slidable printing plates, each stationary spacer plate having at the upper end thereof a block projecting into said printing field for providing a series of basic reference characters between the coded characters provided by said slidable printing plates.

4. A printing recorder as set forth in claim 2 including a fixed and vertically extending spacer plate between each adjacent pair of slidable printing plates, each stationary spacer plate having at the upper end thereof a block projecting into said printing field for providing a series of basic reference characters between the coded characters provided by said slidable printing plates, each said annular disc having a third arcuate sector including a plurality of spaced detent notches, spring means mounted in said housing resiliently engaging one of said plurality of detent notches to position one of said spaced, raised numerals on said annular disc in said printing field.

5. The structure as defined in claim 2 wherein a fixed and vertically extending spacer plate is disposed between each of the plurality of annular discs, each said stationary spacer plate having at its upper end a raised block projecting into the printing field and forming a datum for the said spaced and raised blocks on said sliding vertical printing plates, all of said raised blocks on said spacer plates and sliding printing plates being of the same height.

6. The structure as defined in claim 2 wherein a fixed and vertically extending spacer plate is disposed between each of the plurality of annular discs, each said stationary spacer plate having at its upper end a raised block projecting into the printing field and forming a datum for the said spaced and raised blocks on said sliding vertical printing plates, all of said raised blocks on said spacer plates and sliding printing plates being of the same height, each said annular disc having a third arcuate sector including a plurality of spaced detent notches, spring means mounted in said housing resiliently engaging one of said plurality of detent notches to position one of said spaced, raised numerals on said annular disc in said printing field.

7. In a printing recorder having a substantially flat surface defining a printing field, a horizontal rod mounted in said record substantially parallel to said surface, a plurality of annular discs rotatably mounted on said rod, each annular disc being provided with a first arcuate sector portion having thereon a plurality of spaced and raised numerals adapted to project selectively into said printing field, each said annular disc having a second arcuate sector portion including thereon adjacent peripheral camming surfaces of progressively varying radial distances from the axis of said rod, a substantially flat slide plate mounted adjacent said rotatable discs, a plurality of vertical and spaced printing plates slidably mounted on said slide plate, each vertical printing plate resiliently engaging one of said rotatable annular discs and having thereon a horizontally extending portion with a free end thereof bearing against the cammed peripheral surface of the corresponding rotatable annular disc whereby the linear movement of said vetrical plate conforms to the radial spacing of said camming surfaces on said annular disc, actuating spring means engaging each of said vertical printing plates for moving and maintaining the said free end of the horizontally extending extension of each vertical printing plate resiliently against the cammed peripheral surface of the corresponding rotatable annular disc, the linear movement of each said vertical plate being limited to the radial spacings between said cam surfaces on said annular disc, each vertical printing plate having at its upper end a series of spaced and raised coding blocks of uniform height projecting in said printing field, and laterally offset means for rotating each disc individually.

8. A printing recorder comprising a housing, a base mounted in said housing and having a substantially flat surface defining a printing field, means associated with said base for holding embossed and debossed cards on said flat surface and in said printing field, means for holding invoices over said surface and in said printing field, a horizontal rod mounted in said housing substantially parallel to said surface of said base, a plurality of annular discs rotatably mounted on said rod, each annular disc being provided with a first arcuate sector having thereon a plurality of peripherally spaced and raised numerals adapted to project selectively into said printing field, each said annular disc having a second arcuate sector including a plurality of positioning notches therein, a plurality of leaf springs mounted in said housing, each leaf spring having thereon a V-shaped portion resiliently urged into the positioning notches of the said second arcuate sector of its corresponding disc so as to retain selectively said numerals in said printing field, each disc having a third arcuate sector including a peripheral cammed surface portions of which are gradually variably positioned in distance from the longitudinal axis through said horizontal rod, a substantially flat slide plate mounted adjacent said rotatable disc, a plurality of vertical and spaced printing plates slidably mounted on said slide plate, each vertical printing plate being contactingly associated with a rotatable dis and having thereon a horizontally extending portion bearing against the cammed peripheral surface of the corresponding rotatable disc, a spring means associated with each vertical printing plate for moving said printing plate such that its horizontal extension is maintained resiliently in bearing contact against said cammed peripheral surface of said third sector of its corresponding rotatable disc, each vertical printing plate having at its upper end a series of spaced and raised blocks of uniform height but differential areas projecting into said printing field, a plurality of spaced levers rotatably mounted on said horizontal rod, each lever having an outwardly projecting handle portion passing outwardly through said housing in a slot of said housing in which said handle portion is movable, a number plate connected to each lever adjacent said handle portion and interior of said housing, each number plate having printed thereon a series of numerals arranged in space relation, said housing being provided with a hole adjacent each number plate for selectively viewing the printed numerals on said number plate, an arm extending from the end of each lever opposite from its handle portion to one of said rotatable discs at a position radially spaced from said rotatable rod, whereby movement of each handle portion of each lever within its corresponding slot will cause rotation of one of said rotatable discs so as to present a given raised numeral on said disc in said printing field while at the same time moving the corresponding number plate such that the same given printed numeral will appear in the corresponding hole in said housing, a roller support pivotally mounted within said housing above said base plate, a roller yoke slidably mounted on said roller support, a roller rotatably mounted in said yoke, a roller handle attached to said yoke, means for locking said roller support in substantially parallel relation over said printing field, whereby as said roller handle is pulled in a horizontal direction, said roller will pass over said invoice and urge the same against all of the raised characters in said printing field.

9. A printing recorded comprising a housing, a base mounted in said housing and having a substantially flat surface defining a printing field, means associated with said base for holding embossed and debossed cards on said flat surface and in said printing field, means for holding invoices over said surface and in said printing field, a horizontal rod mounted in said housing substantially parallel to said surface of said base, a plurality of annular discs rotatably mounted on said rod, each annular disc being provided with a first sector having thereon a plurality of peripherally spaced and raised numerals adapted to project selectively into said printing field, each said annular disc having a second arcuate sector including a plurality of positioning peripheral notches therein, a plurality of leaf springs mounted in said housing, each leaf spring having thereon a V-shaped portion resiliently urged into the positioning notches of the said second arcuate sector of its corresponding disc so as to retain selectively said numerals in said printing field, each disc having a third arcuate sector including a peripheral cammed surface in the form of a series of steps, said steps corresponding in number to the number of raised numerals on said first sector and being positioned at progressively different radial distances from the longitudinal axis through said horizontal rod, substantially flat slide plate mounted adjacent said rotatable discs, a plurality of vertical and spaced printing plates slidably mounted on said slide plate, each vertical printing plate being contactingly associated with a rotatable disc and having thereon a horizontally extending portion bearing against the said peripheral cammed surface of the corresponding rotatable disc, a spring means directly associated with each vertical printing plate for moving said printing plate such that its horizontal extension bears resiliently against said third sector of its corresponding rotatable disc, the linear movement of said vertical plate being limited to the radial spacings of said cam surfaces on said annular disc, each vertical printing plate having at its upper end a series of spaced and uniformly raised blocks of differential length projecting into said printing field, a fixed and vertically extending spacer plate between each adjacent pair of slidable printing plates, each stationary spacer plate having at the upper end thereof a block projecting into said printing field, a plurality of spaced levers rotatably mounted on said horizontal rod, each lever having an outwardly projecting handle portion passing outwardly through said housing in a slot of said housing in which said handle portion is movable, an arcuate number plate connected to each lever adjacent said handle portion and interior of said housing, each number plate having printed thereon a series of numerals arranged in space relation, said housing being provided with a hole adjacent each number plate for selectively viewing the printed numerals on said number plate, an arm extending from the end of each lever opposite from its handle portion to one of said rotatable discs at a position radially spaced from said rotatable rod, whereby movement of each handle portion of each lever within its corresponding slot will cause rotation of one of said rotatable discs so as to present a given raised numeral on said disc in said printing field while at the same time moving the corresponding number plate such that the same given printed numeral will appear in the corresponding hole in said housing, a pair of spaced supporting arms pivotally mounted within said housing above said base plate, a roller yoke slidably mounted on said supporting arms, a pair of rollers rotatably mounted one above the other in said yoke, the upper roller bearing against said supporting arms, the lower roller being in surface contact with said upper roller, a roller handle attached to said yoke, means for locking said supporting arms in substantially parallel relation over said printing field, whereby, as said roller handle is pulled in a horizontal direction, said lower roller will pass over said invoice and urge the same against all of the raised characters in said printing field, said upper roller in moving against said supporting arms assisting in the rotation of said lower rollers.

10. In a printing recorder having a substantially flat surface defining a printing field, a horizontal rod mounted in said recorder substantially parallel to said surface, a plurality of annular discs rotatably mounted on said rod, each annular disc being provided with a first arcuate sector portion having thereon a plurality of spaced and raised numerals adapted to project selectively into said printing field, each said annular disc having a second arcuate sector portion thereon including adjacent peripheral camming surfaces of progressively varying radial distances from the axis of said rod, a substantially flat slide plate mounted adjacent said rotatable discs, a plurality of vertical and spaced printing plates slidably mounted on said slide plate, each vertical printing plate resiliently engaging one of said rotatable annular discs and having thereon a horizontally extending portion with a free end thereof bearing against the cammed peripheral surface of the corresponding rotatable annular disc whereby the linear movement of said vertical plate conforms to the radial spacing of said camming surfaces on said annular disc, actuating spring means engaging each of said vertical printing plates for moving and maintaining the said free end of the horizontally extending extension of each vertical printing plate resiliently against the cammed peripheral surface of the corresponding rotatable annular disc, the linear movement of each said vertical plate being limited to the radial spacings between said cam surfaces on said annular disc, each vertical printing plate having at its upper end a series of spaced and raised coding blocks of uniform height projecting into said printing field, said series of spaced blocks being of progressive length, a fixed and vertically extending spacer plate between each adjacent pair of said spaced printing plates, each said stationary spacer plate having at its upper end a raised block projecting into the printing field, said blocks each forming a reference datum for the coding blocks on each of said linearly movable slide plates, and laterally offset means for rotating each disc individually.

11. In a printing recorder having a substantially flat surface defining a printing field, a horizontal rod mounted in said recorder substantially parallel to said surface, a plurality of annular discs rotatably mounted on said rod, each annular disc being provided with a first arcuate sector portion having thereon a plurality of spaced and raised numerals adapted to project selectively into said printing field, each said annular disc having a second arcuate sector portion thereon including adjacent peripheral camming surfaces of progressively varying radial distances from the axis of said rod, a substantially flat slide plate mounted adjacent said rotatable discs, a plurality of vertical and spaced printing plates slidably mounted on said slide plate, each vertical printing plate resiliently engaging one of said rotatable annular discs and having thereon a horizontally extending portion with a free end thereof bearing against the cammed peripheral surface of the corresponding rotatable annular disc whereby the linear movement of said vertical plate conforms to the radial spacing of said camming surfaces on said annular disc, actuating spring means engaging each of said vertical printing plates for moving and maintaining the said free end of the horizontally extending extension of each vertical printing plate resiliently against the cammed peripheral surface of the corresponding rotatable annular disc, the linear movement of each said vertical plate being limited to the radial spacings between said cam surfaces on said annular disc, each vertical printing plate having at its upper end a series of spaced and raised coding blocks of uniform height projecting into said printing field, said series of spaced blocks being of progressive length, a fixed and vertically extending spacer plate between each adjacent pair of said spaced printing plates, each said stationary spacer plate having at its upper end a raised block projecting into the printing field, said blocks each forming a reference datum for the coding blocks on each of said linearly movable slide plates, each said annular disc having a third arcuate sector including a plurality of peripheral detent notches thereon, spring means mounted in said housing resiliently engaging one of said plurality of notches to yieldingly hold each said annular disc in one of a plurality of predetermined positions, and laterally offset means for rotating each disc individually to any one of said plurality of predetermined positions.

References Cited in the file of this patent

UNITED STATES PATENTS

| | | |
|---|---|---|
| 1,252,787 | Cumpston | Jan. 8, 1918 |
| 1,430,014 | Hyman | Sept. 26, 1922 |
| 1,657,712 | Goldberg | Jan. 31, 1928 |
| 2,050,745 | Woodruff et al. | Aug. 11, 1936 |
| 2,077,433 | Osborn | Apr. 20, 1937 |
| 2,293,713 | Connor | Aug. 25, 1942 |
| 2,530,049 | Ekblom | Nov. 14, 1950 |
| 2,555,148 | Mitchell | May 29, 1951 |
| 2,582,187 | Wolowitz | Jan. 8, 1952 |
| 2,751,008 | Cunningham | June 19, 1956 |
| 2,874,632 | Collins | Feb. 24, 1959 |
| 2,909,998 | Maul | Oct. 27, 1959 |
| 2,918,123 | Balde | Dec. 22, 1959 |